(12) United States Patent
Zhang et al.

(10) Patent No.: US 10,095,686 B2
(45) Date of Patent: Oct. 9, 2018

(54) TRENDING TOPIC EXTRACTION FROM SOCIAL MEDIA

(71) Applicant: ADOBE SYSTEMS INCORPORATED, San Jose, CA (US)

(72) Inventors: Lei Zhang, San Jose, CA (US); Paul Jones, Lehi, UT (US); Kent Aaron Otis, Highland, UT (US); Jonathan Gale, San Jose, CA (US); Evelyn Chan, Las Vegas, NV (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 436 days.

(21) Appl. No.: 14/679,736

(22) Filed: Apr. 6, 2015

(65) Prior Publication Data

US 2016/0292157 A1 Oct. 6, 2016

(51) Int. Cl.
*G06F 17/30* (2006.01)
*G06F 17/27* (2006.01)
*G06Q 50/10* (2012.01)

(52) U.S. Cl.
CPC ...... *G06F 17/2785* (2013.01); *G06F 17/2765* (2013.01); *G06F 17/30684* (2013.01); *G06F 17/30867* (2013.01); *G06Q 50/10* (2013.01)

(58) Field of Classification Search
CPC .................. G06F 17/30867; G06F 17/30064
See application file for complete search history.

(56) References Cited

U.S. PATENT DOCUMENTS

| | | | | |
|---|---|---|---|---|
| 6,996,529 | B1* | 2/2006 | Minnis | G10L 13/10 704/258 |
| 2009/0144609 | A1* | 6/2009 | Liang | G06F 17/21 715/230 |
| 2010/0119053 | A1* | 5/2010 | Goeldi | G06Q 10/00 379/265.09 |
| 2011/0029636 | A1* | 2/2011 | Smyth | G06F 17/3089 709/217 |
| 2011/0302103 | A1* | 12/2011 | Carmel | G06Q 30/0282 705/347 |
| 2012/0047219 | A1* | 2/2012 | Feng | G06F 17/3071 709/207 |
| 2013/0007033 | A1* | 1/2013 | Brown | G06F 17/30654 707/764 |
| 2013/0275527 | A1* | 10/2013 | Deurloo | H04L 51/32 709/206 |

(Continued)

OTHER PUBLICATIONS

Lam et al., "Mulitlingual Topic Detection Using a Parallel Corpus", 2000, Proceedings of the DARPA TDT 2000 Workshop.*

(Continued)

*Primary Examiner* — Apu Mofiz
*Assistant Examiner* — Sheryl Holland
(74) *Attorney, Agent, or Firm* — Shook, Hardy & Bacon, L.L.P.

(57) ABSTRACT

Real-time topic analysis for social listening is performed to help users and organizations in discovering and understanding trending topics in varying degrees of granularity. A density-based sampling method is employed to reduce data input. A lightweight NLP method is utilized for topic extraction which provides an efficient mechanism for handling dynamically-changing content. In embodiments, the social analytics system further helps users understand the topics by ranking topics by relevance, labeling topic categories, and grouping semantically-similar topics.

19 Claims, 5 Drawing Sheets

(56) References Cited

U.S. PATENT DOCUMENTS

| | | | | |
|---|---|---|---|---|
| 2013/0298038 | A1* | 11/2013 | Spivack | H04L 65/403 715/753 |
| 2014/0019118 | A1* | 1/2014 | Tromp | G06F 17/274 704/9 |
| 2014/0074608 | A1* | 3/2014 | Beck | G06Q 30/0273 705/14.54 |
| 2014/0258198 | A1* | 9/2014 | Spivack | G06N 5/046 706/21 |
| 2014/0358891 | A1* | 12/2014 | Anstandig | G06Q 30/0201 707/710 |
| 2014/0365452 | A1* | 12/2014 | Ma | G06F 17/30864 707/706 |
| 2015/0052087 | A1* | 2/2015 | Srinivasan | G06N 99/005 706/12 |
| 2015/0286928 | A1* | 10/2015 | Demiralp | H04L 67/10 706/61 |
| 2016/0155063 | A1* | 6/2016 | Rich | G06N 99/005 706/12 |

OTHER PUBLICATIONS

Corral, "Fitting and goodness-of-fit test of non-truncated power-law distributions", Mar. 12, 2013, Springer-Verlag.*

Malik et al., "TopicFlow: Visualizing Topic Alignment of Twitter Data over Time", Aug. 29, 2013, ACM.*

Pal et al., "Identifying Topical Authorities in Microblogs", 2011, ACM.*

Ghong et al., "Generic Text Summarization Using Relevance Measure and Latent Semantic Analysis", 2001, SIGIR ACM.*

Li, R., Wang, S., & Chang, K. C. C. (2013). Towards social data platform: Automatic topic-focused monitor for twitter stream. Proceedings of the VLDB Endowment, 6(14), 1966-1977.

McCreadie, R., Macdonald, C., Ounis, I., Osborne, M., & Petrovic, S. (Oct. 2013). Scalable distributed event detection for twitter. In Big Data, 2013 IEEE International Conference on (pp. 543-549). IEEE.

Weng, J., & Lee, B. S. (2011). Event detection in twitter. ICWSM, 11, 401-408.

Ritter, A., Etzioni, O., & Clark, S. (Aug. 2012). Open domain event extraction from twitter. In Proceedings of the 18th ACM SIGKDD international conference on Knowledge discovery and data mining (pp. 1104-1112). ACM.

Allan, J. (Ed.). (2012). Topic detection and tracking: event-based information organization (vol. 12). Springer Science & Business Media. 272 pages.

* cited by examiner

TRENDING TOPIC EXTRACTION FROM SOCIAL MEDIA

BACKGROUND

Social networking has become an increasingly popular presence on the Internet. Social network services allow users to easily connect with friends, family members, and other users in order to share, among other things, comments regarding activities, interests, and other thoughts. As social networking has continued to grow, organizations have recognized its value. For instance, companies have found that social networking provides a great tool for managing their brand and driving consumers to their own web sites or to otherwise purchase their products or services. Companies can create their own social networking profiles for communicating with consumers via social networking posts and other messages. Additionally, since users often employ social networking to comment on products and services, companies can mine social data to identify what consumers are saying about them, as well as their products, services, and industry in general.

Identifying trending topics, particularly in real-time, within a social network environment can be difficult due to the extensive amount of available content. In particular, processing such large amounts of data can be both time and computationally intensive. Further, traditional topic extraction methods assign data to a pre-determined set of topics which is not effective for the rapidly changing and unpredictable content typical in social media. Traditional topic extraction methods assign data to a pre-determined set of topics which is not effective for the rapidly changing and often unpredictable content in social media. Consequently, traditional topic extraction methods result in inaccurate or outdated trends being identified to users. Still further, because social media is often noisy, discovering meaningful topics and determining when a term actually has meaning is a challenge.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention relate to facilitating identification of trending topics in social media (e.g., tweets, Facebook posts, and forum discussions). In particular, the vast amount of data is sampled to reduce data input and topics are extracted and ranked in an efficient and meaningful way for handling dynamically-changing content. More particularly, a density-based data sample is retrieved from social media streams within a selected time span. Natural language processing is utilized to identify candidate topics that are then ranked by an Accumulated Term Frequency-Inverse Document Frequency (ATF-IDF) algorithm to identify trending topics that are identified as the data is being consumed. The trending topics are classified into categories, such as person, location, or organization. A clustering algorithm groups semantically-similar topics which provide insight for decision making and business intelligence.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The terms "social networking service", "social networking site", and "social media" refer to any online presence at which a user may share comments with other users within a social network. For instance, this may include services, such as the TWITTER, FACEBOOK, LINKEDIN, TUMBLR, and YOUTUBE services, to name a few.

A "social media stream" refers to any content provided by one or more social networking services. For example, a social media stream may include content contributed by a user to the social networking service. The social media stream may additionally include content contributed by advertisers of the social networking service. The social media stream may further include content contributed by the social networking service.

A "sample" includes a portion of the social media stream that may include content responsive to a selection of a social networking service, demographic (e.g., location, time, type of user, or age of user), or content of contributions to the social networking service.

The term "natural language processing" (NLP) refers to a machine learning process. NLP may be used to extract candidate topics from within the content. Single words and phrases are selected based on corresponding part-of-speech tags. For example, a word may be a candidate topic if its part-of-speech tag is a proper noun (NNP), a plural proper noun (NNPS), or a cardinal number (CD).

The term "candidate topic" refers to a topic identified within the content that may be a trending topic. A candidate topic may be extracted from the content by NLP as described herein. Candidate topics can be ranked to identify trending topics.

The term "trending topics" refers to topics that appear in the most posts in a selected time period. In this regard, trending topics have higher relevance scores or rankings than other topics in the same time period.

The term "named entity recognition" refers to a process to help a user better understand extracted topics by classifying extracted topics into categories (e.g., person, organization, or location).

The term "semantically-similar topics" refers to topics that may share a common meaning or otherwise be associated or related. These topics may be clustered into groups to provide a broad overview of social media.

A "popular user" refers to an influential user, such as a celebrity, an expert, an organization, or other user that may lead, identify, or contribute to trends in social media.

A "follower" is a user that is friends with, linked to, or subscribed to another user or popular user such that the follower is aware of content that the other user or popular user contributes to a social networking service.

A "post" is any content made by a user to a social networking service. For example, a post may include text, an image, a video, a link, content contributed by another user and shared to the account of the user, and the like.

The term "bin" refers to a portion of sampled data. The sampled data may be split into equal portions by time stamp. The bin may further be set to different sizes depending on the goal for identifying trending topics. For example, if a trending topic is desired for the last hour, a bin count M may be set to 60, resulting in a bin size of one minute length per bin. The bin may comprise a number of content, such as posts.

An "expected sample count" is the expected number of times a term is expected in a particular bin and is based on the number of posts in that bin. For example, if one bin has a high data density (i.e., a large number of posts) compared to other bins, then the expected sample count will also be higher for that bin compared to the expected sample count of the other bins.

The term "topic boundaries" refers to the start and/or end of possible spans of words that likely belong to a candidate topic. These boundaries provide a basis for later categorizing the topics.

The term "Accumulated Term Frequency" (ATF) refers to an indication of the total number of times a term occurs in a sample comprising a number of posts. A term is only counted once in each post.

A "term frequency" refers to the number of times a term occurs in content, such as a post.

The term "Inverse Document Frequency" (IDF) refers to an indication of how common or rare a particular term is among a collection of posts, such as in a social media stream. The IDF may be calculated by dividing the total number of posts by the number of posts containing the term, and then taking the logarithm of that quotient.

The "relevance score" is the numerical indication of the relevance of a particular topic. The higher the relevance score for a particular topic in relation to relevance scores of other topics indicate the particular topic is a trending topic.

The term "classification rules" refers to rules that take into account internal and/or external evidence to classify extracted topics into categories (e.g., person, organization, or location). The rules may be manually crafted. Internal evidence includes company designators or first names. External evidence includes appositives or certain keywords preceding or succeeding a possible name.

The term "dictionary sources" refers to online dictionary sources, such as Wikipedia, that may be used to classify extracted topics into categories when the classification rules fail to properly classify an extracted topic.

An "unknown topic" is an extracted topic that cannot be classified by the classification rules. In these instances, dictionary sources may be utilized to classify the unknown topics.

To assist companies in their social networking efforts, some social analysis tools, such as ADOBE SOCIAL, have been developed that provide mechanisms for companies to collect information regarding what consumers are saying. Managing this large amount of data has proven difficult. According to INTERNET LIVE STATS, there are currently more than 6,000 tweets on TWITTER per second, which corresponds to over 350,000 tweets per minute and over 500 million tweets per day. For a popular theme (e.g., Adobe), there could be thousands of mentions in various social media streams every second. Additionally, topic analysis functionality is generally coupled with user interfaces, which have a very low response latency requirement (i.e., users interacting with these user interfaces do not want to wait long periods of time on results). Identifying and extracting topics in real time from enormous data sets is extremely challenging for traditional topic extraction algorithms, which are very computationally-intensive, and meeting the low response latency requirements is currently not possible.

Further, the content of social media changes rapidly. Traditional topic extraction algorithms typically cluster words with similar burst patterns. This requires the number of topics expected to be extracted to be pre-set. However, because of the temporal nature of social media, it is difficult to determine such a topic set in advance. In addition, organizations may be interested in discovering and understanding trending topics in varying degrees of granularity. For instance, the organization may wish to identify trending topics for the generic organization (e.g., Adobe) or specific to a product (e.g., Adobe Photoshop) at different points in time. Traditional topic extraction algorithms (supervised learning algorithms) are unable to handle such heterogeneous content because they generally assume that the training data distribution coincides with the test data distribution. But this assumption does not work well for social media data because classifiers trained in one domain (or data set) do not perform well in another domain (or data set). Instead, the quickly changing nature of social data and customer requirements require that the topic set is determined as the data is consumed, which is not possible with traditional topic extraction algorithms.

Still further, social media is often very noisy. According to a recent study, nearly 30-40 percent of all tweets are not informative or actionable for organizations. For instance, although a tweet in which a user indicates that the user has "to draw a picture using Adobe Photoshop" is important to the user in building the user's social presence, it does not actually indicate anything meaningful to the organization (e.g., Adobe). Thus, discovering meaningful topics from social media and determining when a term actually has meaning is a challenge.

Because of the enormous data sets inherent to social data and the computationally-intensive nature of traditional topic extraction algorithms, these traditional topic extraction algorithms cannot process the data in real-time. However, because user interfaces are typically utilized in topic analysis, real-time processing is vital. Further, traditional topic extraction algorithms fail to accurately identify trending topics because traditional topic extraction algorithms require a set of topics to be pre-identified. However, due to the rapidly changing content inherent to social data, it is not possible to pre-identify topics. Because of the enormous data sets inherent to social data and the computationally-intensive nature of traditional topic extraction algorithms, these traditional topic extraction algorithms cannot determine topic sets as the data is consumed. Even when topics are identified, because social media is so noisy, as described above, determining when that topic actually has meaning cannot be accomplished using traditional topic extraction algorithms.

Embodiments of the present invention facilitate, among other things, a social analytics system that performs real-time topic analysis for social media data. The social analytics system manages the large data problem by enabling a user to select a data source, which also helps determine when a topic actually has meaning. The social analytics system further manages the large data problem by employing a density-based sampling method, described below, to reduce data input. A lightweight NLP method, also described below, is utilized for topic extraction which provides an efficient mechanism for handling dynamically-changing content without requiring a user to pre-identify topics. The social analytics system counters the noise problem by ranking topics by relevance without relying on term frequency, as described below. The social analytics system further helps users understand the topics by labeling topic categories and grouping semantically-similar topics.

Figures 1, 2:
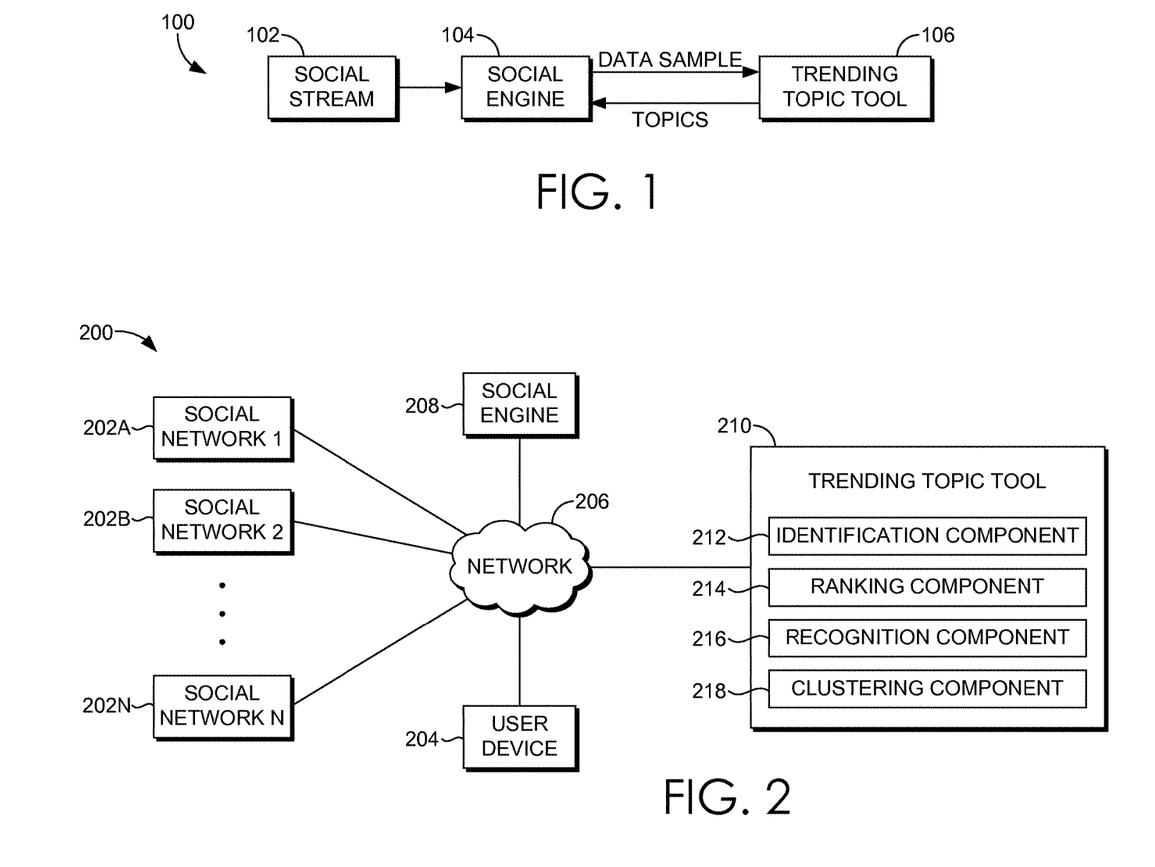
FIG. 1 is a block diagram showing an exemplary workflow for identifying trending topics in accordance with an embodiment of the present invention.
FIG. 2 is a block diagram showing a system for topic identification, ranking, categorizing, and clustering from social media in accordance with an embodiment of the present invention.

Referring initially to FIG. 1, a block diagram is provided illustrating an exemplary workflow 100 for identifying trending topics in accordance with embodiments of the present invention. As illustrated, data from users is communicated from the social stream 102 to the trending topic tool 106 via the social analysis tool 104, such as ADOBE SOCIAL. The data comprises a sample of posts made by users to one or more social networking services. Sampling techniques (described in more detail below with respect to the identification component 212 of FIG. 2) are utilized to retrieve a portion of data from the social data stream within a certain time span that is representative of the full data set. The time span may be configured by a user (e.g., a representative of an organization interested in discovering and understanding trending topics) to identify what topics may have been trending during a particular time span. For example, the user may wish to identify what topics were trending during a recent downturn in sales. This may allow the user to identify what may have caused sales to drop so the user may make corrective measures.

The trending topic tool 106 receives sampled data from the social stream 102 via the social analysis tool 104 in accordance with selections made by the user (e.g., data source, a time constraint, desired demographics, a product, a service, a feature, an organization, a person, or a location). The trending topic tool 106 applies NLP to the sampled data to identify trending topics which are then ranked by an ATF-IDF algorithm. The topics with the highest ranks indicate those topics are more relevant and worth more attention from the user. The topics are further classified by the trending topic tool 106 into three or more categories, such as person, location, or organization. Finally, the trending topic tool 106 groups semantically-similar topics into topic clusters. After trending topics are identified, ranked, categorized, and clustered (as also described in more detail with respect to components of trending topic tool 210 of FIG. 2), the trending topic tool 106 communicates categorized topics and/or topic clusters back to the social analysis tool 104. In some implementations, the trending topic tool 106 is provided as a web service.

Turning now to FIG. 2, a block diagram is provided illustrating an exemplary system 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The topic analysis system 200 generally operates to enable a user to observe trending topics at any point in time or for any filtered set of data. In this regard, the user may identify sentiment-positive or sentiment-negative trending topics associated with a particular social networking service, product, service, feature, organization, person, location, and the like. For example, a shoe company may be able to identify that there is a correlation between a decline in sales and unsatisfied consumers based on a particular shoe design because there were sentiment-negative trending topics for the shoe design during the time frame of decreased sales. Similarly, the shoe company may be able to identify that there was a correlation between having a particular celebrity endorse the same particular shoe design three years ago and a much higher rate of sales, because the particular celebrity and the shoe design were trending topics during that time span.

Among other components not shown, the system 200 may include one or more social networks 202A-202N, a user device 204, a social engine 208, and a trending topic tool 210. It should be understood that the system 200 shown in FIG. 2 is an example of one suitable computing system architecture. Each of the components shown in FIG. 2 may be implemented via any type of computing device, such as computing device 600 described with reference to FIG. 6, for example. The components may communicate with each other via a network 206, which may include, without limitation, one or more local area networks (LANs) and/or wide area networks (WANs). Such networking environments are commonplace in offices, enterprise-wide computer networks, intranets, and the Internet.

It should be understood that any number of user devices, social networks, social engines, trending topic tools, and networks may be employed within the system 200 within the scope of the present invention. Each may comprise a single device or multiple devices cooperating in a distributed environment. For instance, the trending topic tool 210 may be provided via multiple devices arranged in a distributed environment that collectively provide the functionality described herein. In another instance, portions of the trending topic tool 210 may be provided by the user device 204, the social engine 208, one of the social networks 202A-202N, or as a web service provided in the cloud. Similarly, portions of the trending topic tool 210 may be provided by each of the user device 204, the social engine 208, one of the social networks 202A-202N, and as a web service provided in the cloud. Additionally, other components not shown may also be included within the network environment.

As shown in FIG. 2, the trending topics system 200 includes a trending topic tool 210 that includes, among other things not shown, an identification component 212, a ranking component 214, a recognition component 216, and a clustering component 218. The trending topic tool 210 generally operates to receive data from one or more social networks and identifies trending topics based on user selections.

Identification component 212 of the trending topic tool 210 enables a user to reduce data input from the social networks 202A-N. Initially, identification component retrieves a portion of the data from one or more social media streams associated with one or more of the social networks 202A-N. The data can be retrieved in accordance with a user selection via, for example, the user device 204. As indicated, the user selections may include a particular social network, product, service, feature, organization, person, location, and the like. In this regard, the user may begin the process of streamlining the large amount of data into a more manageable data set which allows the trending topics system 200 to return trending topics in real-time or near real-time (i.e., taking into account any normal latency that may exist in devices or communications between devices within or in association with the trending topics system 200).

In embodiments, identification component 212 samples the data utilizing various techniques which reduces the input significantly and provides flexibility for time-dependent topic analysis. In this regard, the trending topic tool 210 is able to sample a fixed amount of data (e.g., 1000 tweets) which allows for a constant processing time. Additionally, the system is able to analyze trending topics in a timely manner regardless of the time dependency selected (e.g., discovering trending topics for "Adobe" in the last hour, week, month, year, etc.).

In embodiments, identification component 212 samples the data based on user type. Typically, there are two types of users in social media: normal users and popular users. The popular users are influencers, such as celebrities, experts, or organizations. Trends in social media are often led, identified, or contributed to by the popular users. On the other hand, normal users represent every other user that is not classified as a popular user. With this in mind, content may be sampled in two different ways with respect to the user type. In one embodiment, the data is sampled from all users. In another embodiment, the data is only sampled from the popular users.

Several different methods can be used to identify popular users. For example, a popular user may be identified based on a number of followers. In this way, popular users have more followers than normal users. Alternatively, a popular user may be identified based on the Page Rank algorithm within a particular social network. Users with higher rank scores are more popular than users with lower rank scores. A popular user may also be identified based on a number of times the user is listed within the social network. As can be appreciated, users with a higher number of listings are more popular users than users with a lower number of listings. In embodiments, popular users are identified by determining an Rscore for each user. The Rscore is defined by: Rscore=f*log n, where f is the number of followers for a particular user and n is the number of posts attributed to that user. A minimum or selected Rscore range can be set to identify the popular users.

To obtain sampled data, a sampling method may also be selected, for example, after the user type is specified. In embodiments, the data set size is preselected, such as 1000 posts. As mentioned above, this allows for a constant processing time. In one embodiment, the sampling method is random sampling. Random sampling can be defined by selecting a social media stream S and an expected sample count N. The first N data from social media stream S is randomly selected and filled into an output list A. In this regard, until the expected sample count N is satisfied, a random number is generated to select a sample from the social media stream S and added to the output list A.

In one embodiment, the sampling method is density-based sampling. Most data sampling methods do not consider information density. For example, if a topic surges in a short period of time, random sampling samples the amount of data proportional to the time length without considering the period of time when the topic surges and an accurate topic distribution cannot be approximated. In the case of social media, topics nearly always appear in a burst pattern. To account for this, data density is taken into consideration by density-based sampling. In other words, for the dense part of the social media stream, more data is sampled. In the same fashion, for the sparse part of the social media stream, less data is sampled. This allows for an accurate topic distribution approximation.

Density-based random sampling for a social media data stream S can be split into M bins by equal time stamp. Utilizing the example above, if a user wishes to identify trending topics for the last hour, the bin count M may be set to 60. This results in a bin size of one minute length per bin. A data count $C_i$ is first calculated for each bin $M_i$. Once the data count $C_i$ is known for each bin $M_i$, an expected sample count $E_i$ is calculated for each bin $M_i$. The expected sample count $E_i$ is defined by $$Ei = \frac{Ci}{S} * N.$$

Here, N is a total expected sample count. For each bin $M_i$, the random sampling methods described above can be utilized to add $E_i$ data samples to the output list A.

In other words, density-based sampling can split the data stream into equal chunks of data by time stamp. In each chunk, an expected sample count is set based on the data density for that chunk. If the data count in one chunk is large, it should have a higher expected sample count. In contrast, if the data count in one chunk is small, it should have a lower expected sample count. The selection of the bin count M may depend on requirements of the user. As can be appreciated, the higher the bin count M, the more precise approximation for topic distribution.

Once the sampling data is retrieved, identification component 212 utilizes NLP to extract or identify candidate topics from the data. Single words and/or phrases may be selected as candidates based on their corresponding part-of-speech (POS) tags. For example, a word may be a candidate topic if its corresponding POS tag is a proper noun (NNP), plural proper noun (NNPS), or cardinal number (CD). NNP and NNPS are normally the POS tags of words starting with an uppercase letter (including words with every letter in uppercase). Identification component 212 can further define a topic boundary (i.e., the start and/or end of possible spans of words that likely belong to a topic) to facilitate the identification of topics. For example, a word or phrase with a sequence of NNP, NNPS, and CD POS tags may represent a topic boundary. Another topic boundary may define that a CD cannot be the first word unless it starts with a letter. For example, "Windows/NNP 8/CD" and "Apple/NNP iPad/NNP 2/CD" are regarded as two topic candidates "Windows 8" and Apple iPad 2". The topic boundary is also the basis for named entity recognition, described below.

After candidate topics are extracted or identified by identification component 212, they are ranked by ranking component 214. Typical ranking algorithms utilize a term frequency (TF)-inverse document frequency (IDF) algorithm. A TF-IDF ranking measures how important a word is to a document in a collection of documents. In this way, the TF-IDF score is the product of the TF and the IDF. However, in social media, TF-IDF scores may not provide an accurate ranking of the importance of a topic (i.e., to identify trending topics) because spammers often post the same content in a single post multiple times. Consequently, the TF-IDF score is skewed and inaccurate. Thus, in embodiments, the ranking component 214 does not use a TF-IDF ranking algorithm and instead uses ATF-IDF to perform topic ranking. ATF is an accumulated term frequency value in a document set, or bin. Note that in each document, the term is counted once even if it occurs more than once. The IDF is defined by: IDF(t, D)=log N/|{d∈D:t∈d}|, where N is the total number of documents (e.g. tweets) of the sampled data and D represents the document set. The relevance score or ranking of a candidate topic t can then be defined as R(t)=($\Sigma_{|\{d \in D: t \in d\}|}$BTF(t, d))*IDF(t, D). Here, BTF is a Boolean frequency value that is set to 1 if topic t occurs in document d. Otherwise, the BTF is set to 0.

Recognition component 216 classifies the topics to help the user better understand and provide meaning to the topics. Recognition component 216 applies named entity recognition to classify extracted topics into categories (e.g., person, organization, or location). To do so, first the recognition component 216 applies classification rules to the topics. The classification rules can be manually crafted and take into account both internal and external evidence. In this regard, the words that comprise the possible names and the context in which the word occurs can be considered. Classification rules relying on internal evidence are generally applied before rules that rely on external evidence. For clarity, internal evidence comprises company designators or first names and external evidence comprises appositives or certain keywords preceding or succeeding a possible name. If there is any ambiguity, classification rules relying on both internal and external evidence may be applied.

In embodiments, recognition component 216 employs classification rules in order. For example, to distinguish names in organization, person, and location, recognition component 216 first classifies organizations because they may include person or location names (organizations are often named after a founder or place they are located in and in full form typically include designators such as Bank, Corp., Inc., and the like). Next, recognition component 216 classifies person names which often include titles or appositive phrases. Lastly, recognition component 216 classifies location names. After recognition component 216 applies all rules, recognition component 216 employs dictionary sources (e.g., Wikipedia) to assign category labels for unknown topics. Recognition component 216 further utilizes partial matching to recognize truncated or variable forms of names. In this way, the organization name "Adobe" may be matched against an unclassified name, such as "Adobe System".

Clustering component 218 groups semantically-similar topics. Because extracted topics are keyword based, the topics may be clustered into groups to gain a broad overview of social media. Many different clustering methods may be applied by clustering component 218. For example, a K-Mean algorithm may be applied to cluster the topics. In one embodiment, the clustering component 218 employs a hierarchical clustering algorithm to group similar keywords/topics. In this regard, the clustering algorithm builds a dendogram (i.e., a tree data structure) from the bottom level and merges the most similar topic pair of clusters at each level before proceeding to the next level. The process continues until the clustering component 218 merges all the topics into a single cluster or several clusters as specified by a user selection. The distance between two topic clusters is the distance between the two closest topics in the two clusters. The clustering component 218 may calculate the distance between the two topics by determining their text similarly, named entity similarity, or surrounding text similarity. Additionally, the clustering component may apply similarity metrics (e.g., cosine similarity metric).

The clustered topics provide the user with a real-time understanding of what is taking place, during a given period of time, within social media. The user may utilize this understanding for business analytics, such as alerting various personnel or business units within an organization of particular trending topics that may require action within the organization. These alerts can drive modification or initiation of social media or marketing campaigns to reinforce sentiment-positive or counter sentiment-negative trending topics, alteration of product design, modification of service offerings, and the like.

Figure 3:
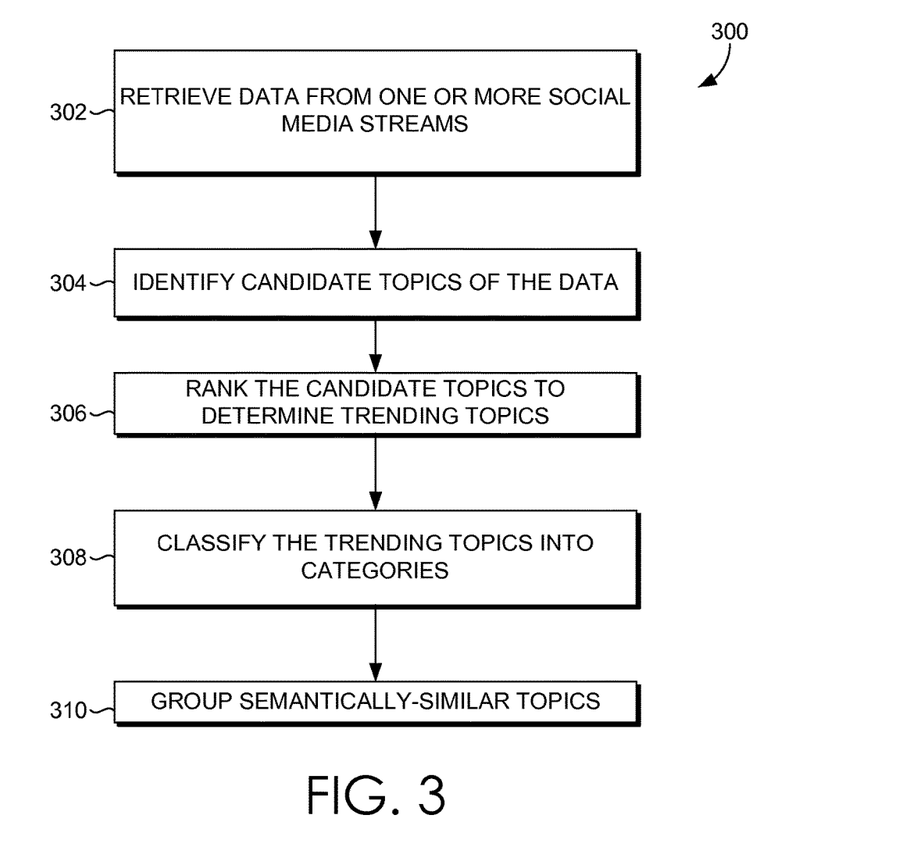
FIG. 3 is a flow diagram showing a method for identifying, ranking, categorizing and clustering topics from social media in accordance with an embodiment of the present invention.

Referring next to FIG. 3, a flow diagram is provided that illustrates a method 300 for identifying, ranking, recognizing, and clustering topics from social media in accordance with an embodiment of the present invention. Each block of the method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 300 may be provided as part of a trending topic tool, such as the trending topic tool 210 of FIG. 2.

As shown at block 302, data is retrieved from one or more social media streams in accordance with a user selection. In one embodiment, the one or more social media streams are sampled in accordance with a user selection of a data source, a time constraint, desired demographics, a product, a service, a feature, an organization, a person, or a location. For example, the user selection may be for a particular day, week, month, or year. In another embodiment, a fixed amount of data is sampled in accordance with the user selection. For example, the user may select to retrieve 1000 samples of data from the social media stream. In this way, the user retains some control over the processing time.

In one embodiment, the data is sampled utilizing density-based sampling. First, the data from the one or more social media streams may be split into bins in accordance with equal time lengths per bin. For example, if a trending topic is desired for the last hour, the bin count may be set to 60, resulting in a bin size of one minute length per bin. The number of posts in each bin is calculated and an expected sample count for each bin is determined by dividing the number of posts for each bin by a total number of posts in all bins, and then multiplying by the total expected count. Data is retrieved in accordance with the expected sample count for each bin.

In one embodiment, the user selection specifies the data is sampled from all users or popular users. To do so, the users contributing to the sampled data may be ranked to identify which users are popular users. In one embodiment, each user is ranked by multiplying the number of followers for the user by the logarithm of the number of posts for the account of the user.

Candidate topics of the data are identified, at block 304, utilizing natural language processing. Words and phrases are identified, in one embodiment, as candidates based on a part-of-speech (POS) tag being a proper noun, a plural proper noun, or a cardinal number. Topic boundaries that belong to each candidate may be defined so the beginning and ending of a topic may readily be identified. At block 306, the candidate topics are ranked with a relevance score to determine trending topics.

Figure 4:
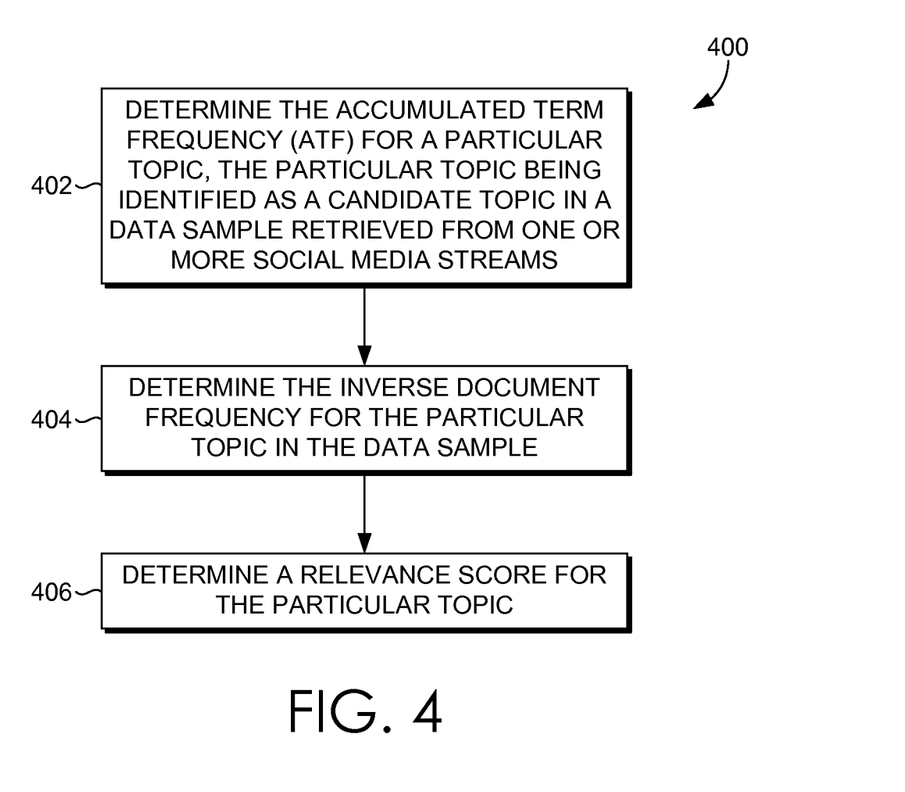
FIG. 4 is a flow diagram showing a method of ranking topics in accordance with an embodiment of the present invention.

In some embodiments, and referring now to FIG. 4, a relevance score is determined for a particular topic. Initially, as shown at block 402, an ATF is determined for a particular topic which has been identified as a candidate topic in a data sample retrieved from one or more social media streams as described herein. At block 404, the IDF is determined for each candidate topic in the data sample. A relevance score is determined, at block 406, for each candidate topic to determine trending topics.

Referring back to FIG. 3, the trending topics are classified into categories at block 308. Classification rules are, in one embodiment, applied to the trending topics. The classification rules may be manually crafted and rely on internal evidence and/or external evidence. In one embodiment, the classification rules that rely on internal evidence are applied before the classifying rules relying on external evidence. The trending topics are classified in accordance with the rules. In embodiments, the classifications include organization, person, and location. Dictionary sources may be utilized to classify unknown topics.

At block 310, semantically-similar topics are grouped to provide a broad and real-time overview of social media. A hierarchical clustering algorithm may be employed to group similar keywords/topics. A dendogram may be built from the bottom level and merges the most similar topic pair of clusters at each level before proceeding to the next level. The process continues until all the topics are merged into a single cluster or several clusters as specified by a user selection. The distance between two topic clusters is the distance between the two closest topics in the two clusters. The distance between the two topics may be calculated by determining their text similarly, named entity similarity, or surrounding text similarity. Additionally, similarity metrics may be applied.

Figure 5:
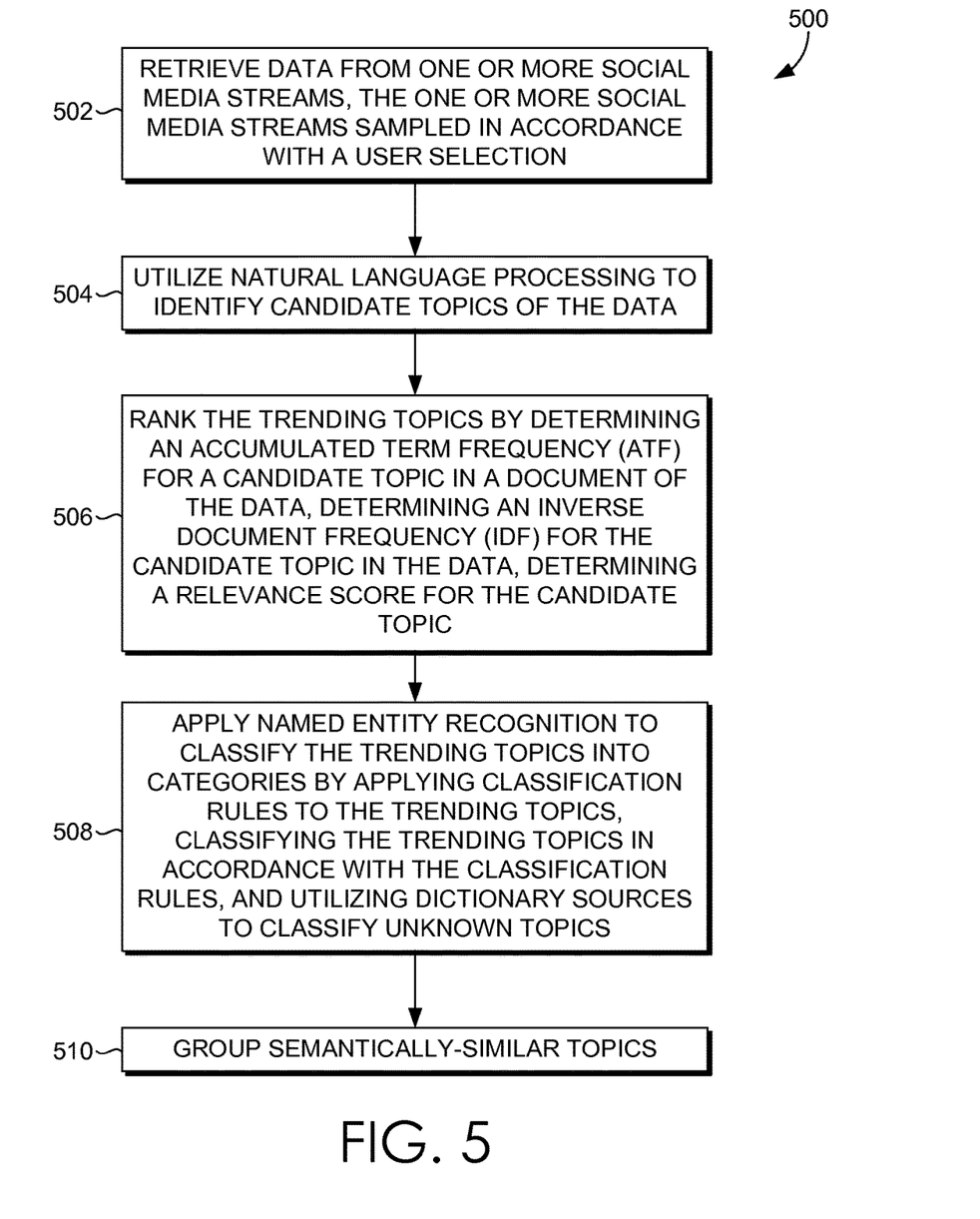
FIG. 5 is a flow diagram showing an exemplary method for identifying, ranking, categorizing, and clustering topics from social media in accordance with an embodiment of the present invention.

Referring next to FIG. 5, a flow diagram is provided that illustrates exemplary method 500 for identifying, ranking, recognizing, and clustering topics from social media in accordance with an embodiment of the present invention. Each block of the method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 500 may be provided as part of a trending topic tool, such as the trending topic tool 210 of FIG. 2.

Initially, as shown at block 502, data is retrieved from one or more social media streams. The one or more social media streams are sampled in accordance with a user selection. Natural language processing is utilized, at block 504 to identify candidate topics of the data. At block 506, the candidate topics are ranked by determining an ATF value for each candidate topic in a document of the data, determining an IDF value for each candidate topic in the data, and determining a relevance score for each candidate topic to determine trending topics. The trending topics are classified into categories, at block 508, in accordance with classification rules. Dictionary sources are utilized to classify unknown topics. At block 510, semantically-similar topics are grouped.

Figure 6:
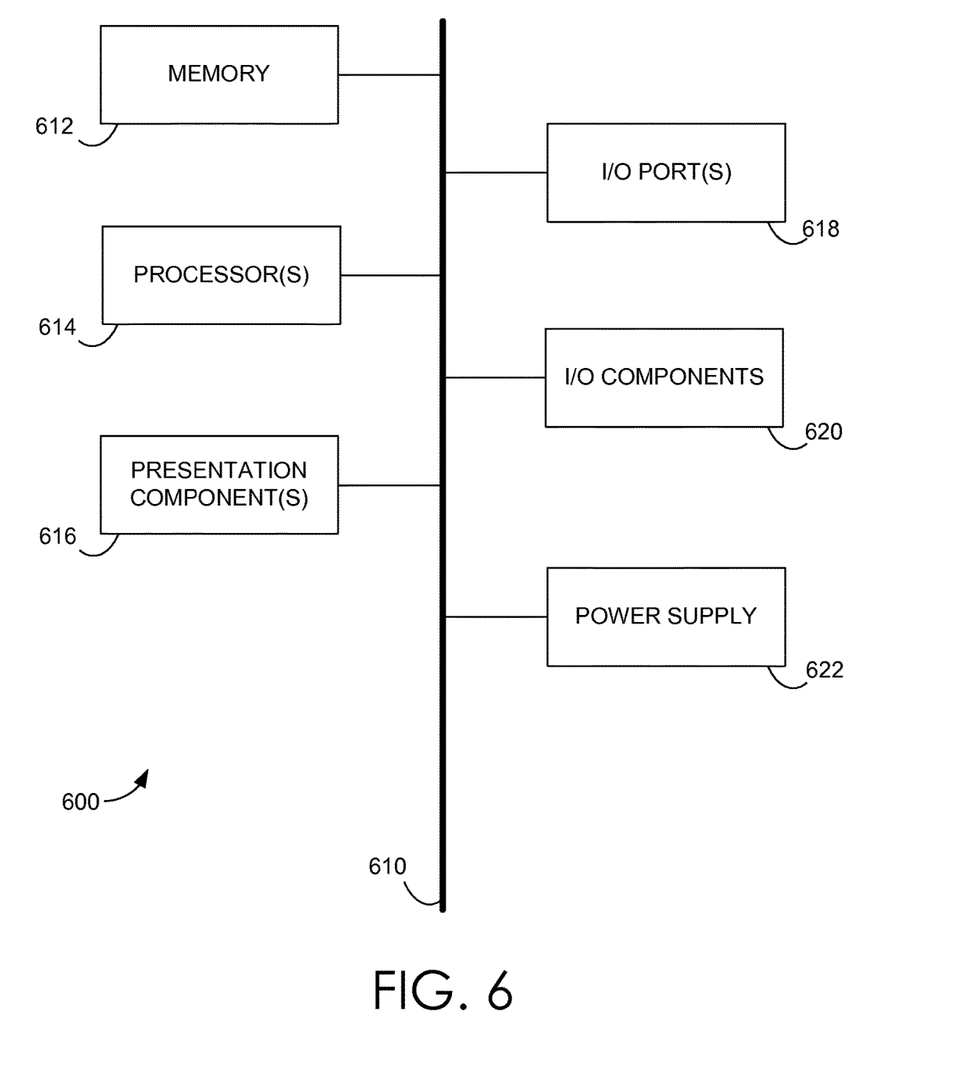
FIG. 6 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention facilitate, among other things, a social analytics system that performs real-time topic analysis for social listening. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   sampling data, via a social engine, from one or more social media streams, in accordance with a user selection received via a user device;
   assigning part-of-speech (POS) tags to text in the data;
   applying natural language processing, by a trending topic tool, to extract candidate topics from the data using a first rule comprising:
      identifying a sequence of a plurality of the assigned POS tags, wherein each POS tag of the sequence is selected from a group consisting of at least one of a proper noun tag, a plural proper noun tag, or a cardinal number tag;
      defining topic boundaries based on the identified sequence; and
      extracting a portion of the text corresponding to the topic boundaries as one of the candidate topics;
   ranking the candidate topics, by the trending topic tool, with a relevance score that quantifies relative importance of each candidate topic to determine trending topics;
   classifying, by the trending topic tool, the trending topics into categories;
   grouping the candidate topics into topic clusters of semantically-similar topics, by the trending topic tool, and
   transmitting the classified and clustered trending topics for display on the user device.

2. The non-transitory computer storage medium of claim 1, wherein the user selection is a time constraint.

3. The non-transitory computer storage medium of claim 1, wherein a fixed amount of data is sampled in accordance with the user selection.

4. The non-transitory computer storage medium of claim 1, wherein the user selection specifies the data is sampled from all users or popular users.

5. The non-transitory computer storage medium of claim 1, further comprising ranking users contributing to the sampled data to identify popular users, and sampling from the popular users in the one or more social media streams to produce the data.

6. The non-transitory computer storage medium of claim 5, wherein each user is ranked by multiplying the number of followers for the user by the logarithm of the number of posts for the account of the user.

7. The non-transitory computer storage medium of claim 1, wherein the data is sampled from the one or more social media streams by:
    splitting the one or more social media streams into bins, the bins being split in accordance with equal time lengths per bin;
    calculating, for a given bin, a ratio of posts in the bin to posts in all the bins;
    determining, for the given bin, an expected sample count by multiplying a defined total number of samples by the ratio for the bin; and
    sampling, from the given bin, to generate a number of samples corresponding to the expected sample count for the bin.

8. The non-transitory computer storage medium of claim 1, wherein applying natural language processing to extract candidate topics comprises using a second rule that prohibits using a cardinal number as a first word of a candidate topic unless the cardinal number starts with a letter.

9. The non-transitory computer storage medium of claim 1, wherein ranking the candidate topics with a relevance score comprises:
    determining an Accumulated Term Frequency (ATF) for a candidate topic in a document of the data, the ATF counting an occurrence of the candidate topic once for each document in which the candidate topic appears;
    determining an Inverse Document Frequency (IDF) for the candidate topic in the data; and
    determining the relevance score for the candidate topic based on the ATF and the IDF for the candidate topic.

10. The non-transitory computer storage medium of claim 1, wherein classifying the trending topics into categories comprises:
    applying classification rules to the trending topics, the classification rules being manually crafted and relying on internal evidence and external evidence, wherein the classification rules that rely on internal evidence are applied before the classifying rules relying on external evidence;
    classifying the trending topics in accordance with the rules, the classifications including organizations, person names, and locations; and
    utilizing dictionary sources to classify unknown topics.

11. A computer-implemented method comprising:
    applying, via a first computing process, natural language processing to extract candidate topics from a data sample comprising a plurality of posts retrieved from one or more social media streams via a social engine, the data sample including text with assigned part-of-speech (POS) tags, wherein the first computing process utilizes a first rule comprising:
        identifying a sequence of a plurality of the assigned POS tags, wherein each POS tag of the sequence is selected from a group consisting of at least one of a proper noun tag, a plural proper noun tag, or a cardinal number tag;
        defining topic boundaries based on the identified sequence; and
        extracting a portion of the text corresponding to the topic boundaries as one of the candidate topics;
    determining, via a second computing process, an Accumulated Term Frequency (ATF) for each candidate topic of the candidate topics, the ATF counting an occurrence of the candidate topic once for each post in which the candidate topic appears;
    determining, via a third computing process, an inverse document frequency (IDF) for each of the candidate topics in the data sample;
    determining, via a fourth computing process, a relevance score that quantifies relative importance of the candidate topics using the ATF and the IDF to determine trending topics; and
    transmitting, via a fifth computing process, the trending topics for display on a user device;
    wherein each of the computing processes is performed by one or more computing devices.

12. The computer-implemented method of claim 11, wherein applying natural language processing to extract candidate topics from the data sample comprises using a second rule that prohibits using a cardinal number as a first word of a candidate topic unless the cardinal number starts with a letter.

13. The computer-implemented method of claim 11, further comprising, classifying, via a sixth computing process, the trending topics into categories.

14. The computer-implemented method of claim 13, wherein classifying the trending topics into categories comprises:
    applying classification rules to the trending topics, the classification rules being manually crafted and relying on internal evidence and external evidence, wherein the classification rules that rely on internal evidence are applied before the classifying rules relying on external evidence;
    classifying the trending topics in accordance with the rules, the classifications including organization, person, and location; and
    utilizing dictionary sources to classify unknown topics.

15. The computer-implemented method of claim 11, further comprising grouping, via a seventh computing process, semantically-similar topics.

16. The computer-implemented method of claim 11, wherein the one or more social media streams are sampled in accordance with a user selection of a data source, a time constraint, desired demographics, a product, a service, a feature, an organization, a person, or a location.

17. The computer-implemented method of claim 11, further comprising ranking users contributing to the sampled data to identify popular users, and sampling from the popular users in the one or more social media streams to produce the data sample, wherein each user is ranked by multiplying the number of followers for the user by the logarithm of the number of posts for the account of the user.

18. The computer-implemented method of claim 11, wherein the data sample is retrieved by:
    splitting the one or more social media streams into bins, the bins being split in accordance with equal time lengths per bin;
    calculating, for a given bin, a ratio of posts in the bin to posts in all the bins;
    determining, for the given bin, an expected sample count by multiplying a defined total number of samples by the ratio for the bin; and
    sampling, from the given bin, to generate a number of samples corresponding to the expected sample count for the bin.

19. A computerized system comprising:
    one or more processors; and
    a non-transitory computer storage media storing computer-useable instructions that, when used by the one or more processors, cause the one or more processors to:

sample data, via a social engine, from one or more social media streams, in accordance with a user selection received via a user device;

assign part-of-speech (POS) tags to text in the data;

apply natural language processing, by a trending topic tool, to extract candidate topics from the data using a first rule comprising:

identifying a sequence of a plurality of the assigned POS tags, wherein each POS tag of the sequence is selected from a group consisting of at least one of a proper noun tag, a plural proper noun tag, or a cardinal number tag;

defining topic boundaries based on the identified sequence; and     extracting a portion of the text corresponding to the topic boundaries as one of the candidate topics;

rank the candidate topics, by the trending topic tool, by determining an Accumulated Term Frequency (ATF) for each candidate topic in a document of the data, the ATF counting an occurrence of each candidate topic once for each document in which the candidate topic appears, determining an Inverse Document Frequency (IDF) for each candidate topic in the data, and determining a relevance score for each candidate topic based on the ATF and the IDF for the candidate topic, to determine trending topics;

classify the trending topics, by the trending topic tool, into categories in accordance with classification rules;

utilize dictionary sources to classify unknown topics;

group the candidate topics into topic clusters of semantically-similar topics, by the trending topic tool, and transmit the classified and clustered trending topics for display on the user device.

\* \* \* \* \*

UNITED STATES PATENT AND TRADEMARK OFFICE
CERTIFICATE OF CORRECTION

PATENT NO.         : 10,095,686 B2
APPLICATION NO.    : 14/679736
DATED              : October 9, 2018
INVENTOR(S)        : Lei Zhang et al.

Page 1 of 1

It is certified that error appears in the above-identified patent and that said Letters Patent is hereby corrected as shown below:

In the Specification

Column 10, Line 7: Please remove "dendogram" and replace with --dendrogram--.

Column 11, Line 43: Please remove "dendogram" and replace with --dendrogram--.

Signed and Sealed this
Eighteenth Day of June, 2019

Andrei Iancu
*Director of the United States Patent and Trademark Office*